United States Patent [19]
Hori

[11] Patent Number: 5,903,784
[45] Date of Patent: May 11, 1999

[54] MANUAL FILM ADVANCE DEVICE FOR USE IN A CAMERA

[75] Inventor: Masakatsu Hori, Tokyo, Japan

[73] Assignee: Asahi Kogaku Kogyo Kabushiki Kaisha, Tokyo, Japan

[21] Appl. No.: 08/883,431

[22] Filed: Jun. 26, 1997

[30] Foreign Application Priority Data

Jul. 8, 1996 [JP] Japan .................................. 8-198372

[51] Int. Cl.[6] ...................................................... G03B 7/26
[52] U.S. Cl. .......................... 396/277; 396/301; 396/395; 396/539
[58] Field of Search ................................... 396/277, 280, 396/301, 395, 396, 411, 539

[56] References Cited

U.S. PATENT DOCUMENTS

| | | | |
|---|---|---|---|
| 4,146,189 | 3/1979 | Sunouchi et al. | 396/411 |
| 4,855,781 | 8/1989 | Hoshino | 396/277 |

Primary Examiner—Eddie C. Lee
Attorney, Agent, or Firm—Sughrue, Mion, Zinn, Macpeak & Seas, PLLC

[57] ABSTRACT

There is provided a battery presence/absence detection mechanism (80) which operates according to the presence/absence of a battery (4) in a battery housing (3). When the battery (4) does not exist in the battery housing (3) or is removed from the same during the course of advancement of film, a battery presence/absence detection lever (801) and first and second battery presence/absence transmission levers (802, 803) operate so as to pivot a first winding lock lever (701) of a double winding prevention mechanism (70) to a position where it prevents the pivotal movement of a ratchet pawl (202) in a first direction. The double winding prevention mechanism (70) is attracted to and held in a reset state in which a film advance lever (10) cannot be actuated, by a magnet (703B) of a lock control means (703) via a second winding lock lever (702). It is possible to prevent wasteful advancement of film and to enable stable advancement of film even if a battery is at the end of its life or is removed from a camera.

15 Claims, 5 Drawing Sheets

MANUAL FILM ADVANCE DEVICE FOR USE IN A CAMERA

BACKGROUND OF THE INVENTION

The present invention relates to a manual film advance device used with a camera, and more particularly to a manual film advance device for use with a camera, such as a Blowny film camera, comprised of a manual film advance mechanism, as well as to a focal-plane shutter and a quick-return mirror which are charged in conjunction with the advancing action of the manual film advance device.

A manual film advance mechanism is generally used for a Blowny film camera, and a focal-plane shutter and a quick-return mirror are charged in conjunction with the film advance mechanism.

Such Blowny film camera is comprised of a film advance stop mechanism, a double film-advance inhibiting mechanism, and a film feed mechanism. The film advance stop mechanism converts into the rotation of a roller the extent to which a film is advanced by actuation of the film advance lever. When a predetermined amount of rotation (corresponding to the amount of rotation required to advance one frame of the film) has been achieved, the film advance stop mechanism prevents the film from being advanced in excess of one frame by stopping a film take-up spool even if the film advance lever has not been actuated all the way to the end of its range. After the film has been advanced one frame by the actuation of the film advance lever, the double film-advance inhibiting mechanism inhibits actuation of the film advance lever until a shutter is released. A rear cover of the camera body is closed after a start mark provided on the reverse side of a Blowny film loaded in the camera has been brought in alignment with an index marked on the body of the camera. The actuation of the film advance lever allows the film feed mechanism to advance the film from the start mark to a position one frame before where the first frame of the film would be placed at the aperture of the camera body, without actuating the focal plane shutter and the quick-return mirror.

If the film advance stop mechanism, the double film-advance inhibiting mechanism, and the film feed mechanism of a conventional Blowny film camera are all mechanically built from levers and gear trains, they become structurally complicated. Further, the number of constituent parts is also increased, thereby adding to the cost of the camera.

The angle through which the film advance lever is actuated is constant, whereas the diameter of the film take-up spool which is rotated in conjunction with the actuation of the film advance lever increases as the film is taken up. If the film advance inhibiting mechanism is operated by detecting the extent of advancement of film through use of only mechanical means, the film advance stop mechanism including a mechanism to detect the extent of advancement of film becomes further complicated. The precision of the parts affects the operation of the film advance stop mechanism, which in turn makes it impossible to ensure stable advancement of film.

The foregoing problem can be solved by electrically detecting the extent of advancement of film through use of a photo-interrupter or the like, and electrically controlling the film advance stop mechanism or the double film-advance inhibiting mechanism by utilization of a resultant electrical detection signal.

However, electrical control of the film advance stop mechanism or the double film-advance inhibiting mechanism requires a power supply, for which a battery is commonly used. As a matter of course, the battery has a life. If the battery is at the end of its life or if the battery is removed from the camera, the film advance stop mechanism or the double film-advance inhibiting mechanism does not work, thereby permitting wasteful advancement of film.

SUMMARY OF THE INVENTION

The present invention has been conceived to solve the previously described problem, and an object of the present invention is to provide a manual film advance device for use with a camera which can ensure stable advance of film by preventing wasteful advance of it even if a battery is at the end of its life or is removed from the camera.

The present invention is characterized by providing a manual film advance device for use with a camera which actuates a film advance drive system in conjunction with the actuation of a film advance lever from a starting point to an end point, the improvement being characterized by comprising a ratchet mechanism having a ratchet wheel which rotates integrally together with the film advance lever and a ratchet pawl which engages with the ratchet wheel; a battery presence/absence detection mechanism which operates according to the presence/absence of the camera; the ratchet pawl being formed in such a way as to pivot in a first direction by the rotation of the ratchet wheel at the time of actuation of the film advance lever, as well as to pivot in a second direction opposite to the first direction by the rotation of the ratchet wheel when the film advance lever returns to the starting point from the end point; a winding prevention mechanism which locks the rotation of the ratchet wheel so as to prevent the advancement of film by limiting the pivotal movement of the ratchet pawl in the first direction in conjunction with the action of the battery presence/absence detection mechanism when the battery presence/absence detection mechanism detects the absence of the battery; and control means which retains the winding prevention mechanism in a reset state in which the film cannot be advanced when the pivotal movement of the ratchet pawl in the first direction is limited.

The manual film advance device further comprises state-of-actuation checking means for checking the charge status of the battery, whereby the winding prevention mechanism is released from the reset state by controlling the control means according to a signal produced when the state-of-actuation checking means decides the charge status of the battery to be equal to or greater than a specified value and to a signal produced when a shutter is released.

Preferably, in the manual film advance device, the battery presence/absence detection mechanism includes a battery presence/absence detection lever which advances or recedes in conjunction with the removal or insertion of the battery from or into the camera, a first battery presence/absence transmission lever which moves in conjunction with the advance or receding of the battery presence/absence detection lever, and a second battery presence/absence transmission lever which operates in conjunction with the first battery presence/absence transmission lever and brings the winding prevention mechanism into the reset state upon detection of the absence of the battery.

Preferably, in the manual film advance device, the ratchet mechanism is arranged in such a way that the ratchet pawl engages with the ratchet wheel thereby to lock the return of the film advance lever when the film advance lever is stopped during the course of its actuation.

Preferably, in the manual film advance device, when the film advance lever returns to the starting point from the end point, the winding prevention mechanism prevents the double advancement of film by limiting the pivotal movement of the ratchet pawl in the first direction in conjunction with the pivotal movement of the ratchet pawl in the second direction so as to lock the rotation of the ratchet wheel.

Preferably, in the manual film advance device, the double winding prevention mechanism has a first winding lock lever, and this first winding lock lever is formed in such a way as to pivot to the position where it limits the pivotal movement of the ratchet pawl in the first direction in conjunction with the pivotal movement of the ratchet pawl in the second direction, as well as to lock the rotation of the ratchet wheel by engaging with the ratchet pawl when the film advance lever is actuated.

Preferably, in the manual film advance device, the winding prevention mechanism is provided with a second winding lock lever which is connected at one end to the first winding lock lever and is connected at the other end to the control means, and this second winding lock lever brings the film advance lever in the reset state by transmitting to the control means the action of the first winding lock lever performed when it is pivoted to limit the pivotal movement of the ratchet pawl in the first direction, and pivots the first winding lock lever to a position where it does not limit the pivotal movement of the ratchet pawl in the first direction according to the release of the winding prevention mechanism from the reset state performed by the control means.

Preferably, in the manual film advance device, the control means is comprised of a movable element connected to the second winding lock lever of the winding prevention mechanism, a magnet which retains the winding prevention mechanism in the reset state by attracting the movable element, and an electromagnet coil which releases the winding prevention mechanism from the reset state by applying power to the magnet so as to decrease its attracting force according to the signal produced when the shutter is released.

Preferably, the manual film advance device further comprises at least one of a shutter actuation drive system and a mirror actuation drive system which operate in conjunction with the pivotal actuation of the film advance lever from the starting point to the end point.

Preferably, the manual film advance device further comprises a film advance stop mechanism which locks the rotation of the spool of the film advance drive system when the extent to which the film is advanced by the film advance drive system in conjunction with the film advance lever has reached a specified extent; film advance detection means which detects the extent to which the film is advanced by the film advance drive system; and second control means which retains the film advance stop mechanism in the state in which the film can be taken up by the spool, and releases it from the take-up enable state according to a signal produced when the film advance detection means detects that the extent of advancement of film has reached the specified extent.

The present invention is characterized by providing a manual film advance device for use with a camera which actuates a film advance drive system, a shutter actuation drive system, and a mirror actuation drive system in conjunction with the actuation of a film advance lever from a starting point to an end point, the improvement being characterized by comprising a winding prevention mechanism which actuates the shutter actuation drive system and the mirror actuation drive system in conjunction with the pivotal movement of the film advance lever from the starting point to the end point and prevents the advancement of film by holding the film advance lever in a lock state unless a shutter is released; a battery presence/absence detection mechanism which operates according to the presence/absence of the camera; state-of-actuation checking means for checking the charge status of the battery; and control means which retains the winding prevention mechanism in a reset state in which the film cannot be advanced when the battery presence/absence detection mechanism operates according to the absence of the battery, and which releases the winding prevention mechanism from the reset state according to a signal produced when the state-of-actuation checking means detects that the charge status of the battery is equal to or greater than a preset value and to a signal produced when the shutter is released.

The present disclosure relates to subject matter contained in Japanese patent application No. 8-198372 (filed on Jul. 8, 1996) which is expressly incorporated herein by reference in its entirety.

DETAILED DESCRIPTION OF A PREFERRED EMBODIMENT

With reference to the drawings, a preferred embodiment of the present invention will be described hereinbelow.

Figure 1:
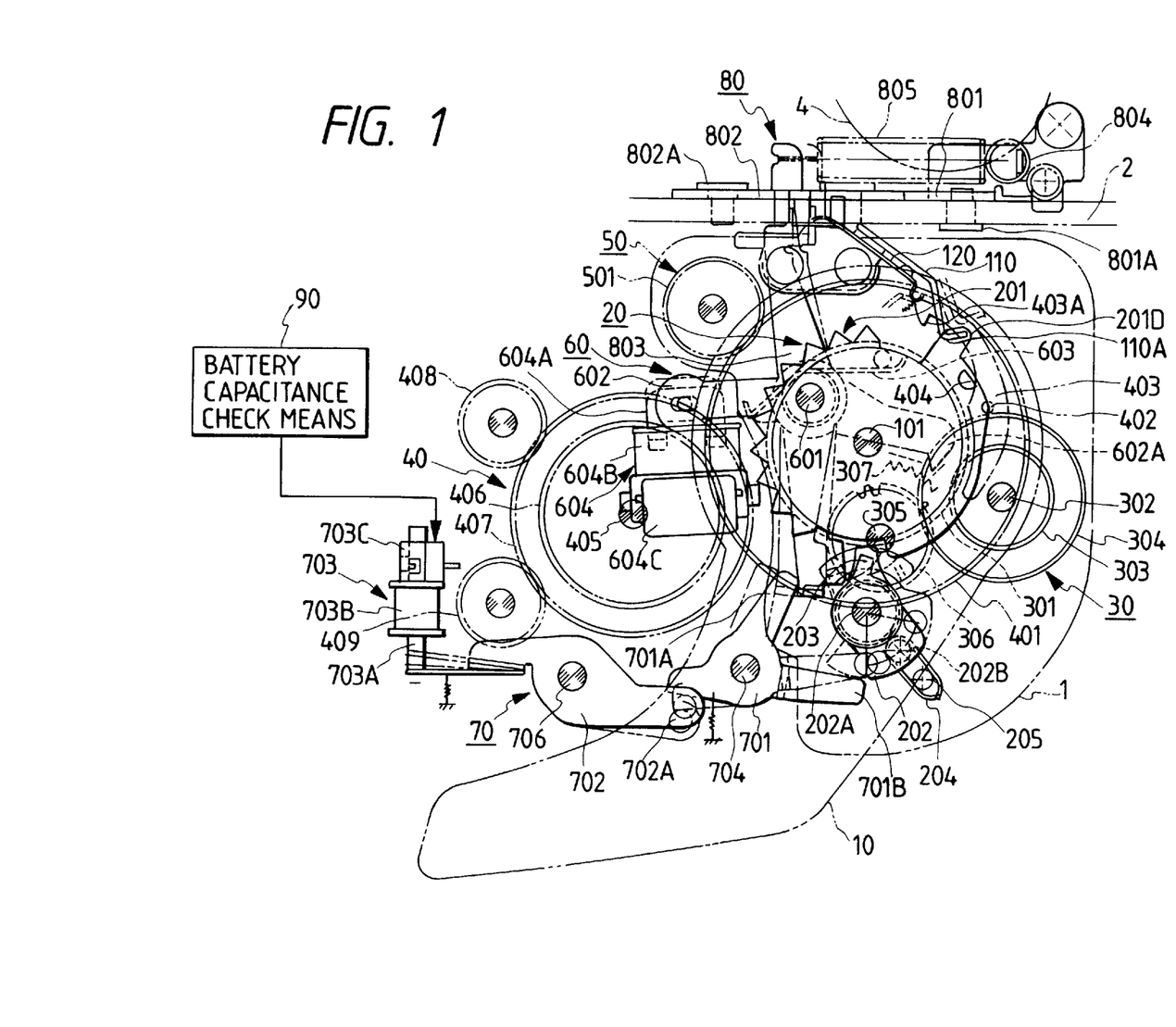
FIG. 1 is a schematic plan view illustrating the configuration of a manual film advance device for use with a medium-format camera according to an embodiment of the present invention.
Figure 2:
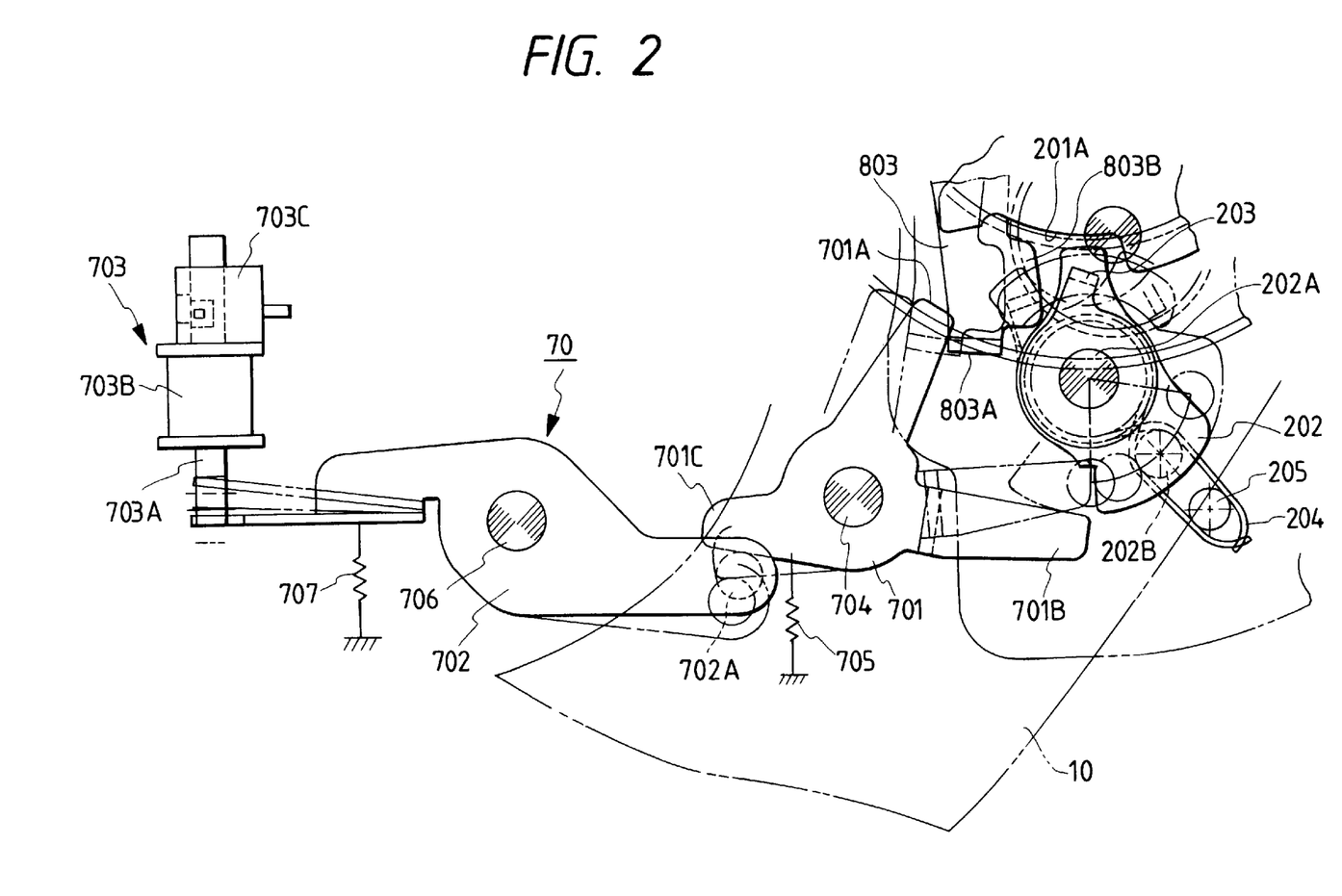
FIG. 2 is an enlarged plan view of a double winding prevention mechanism according to the embodiment of the present invention.

FIG. 1 is a schematic plan view of a film advance device for use with a Blowny film camera according to one embodiment of the present invention. FIG. 2 is an enlarged plan view of a film advance inhibiting mechanism, and FIG. 3 is a side view of a battery presence/absence check mechanism.

Figure 3:
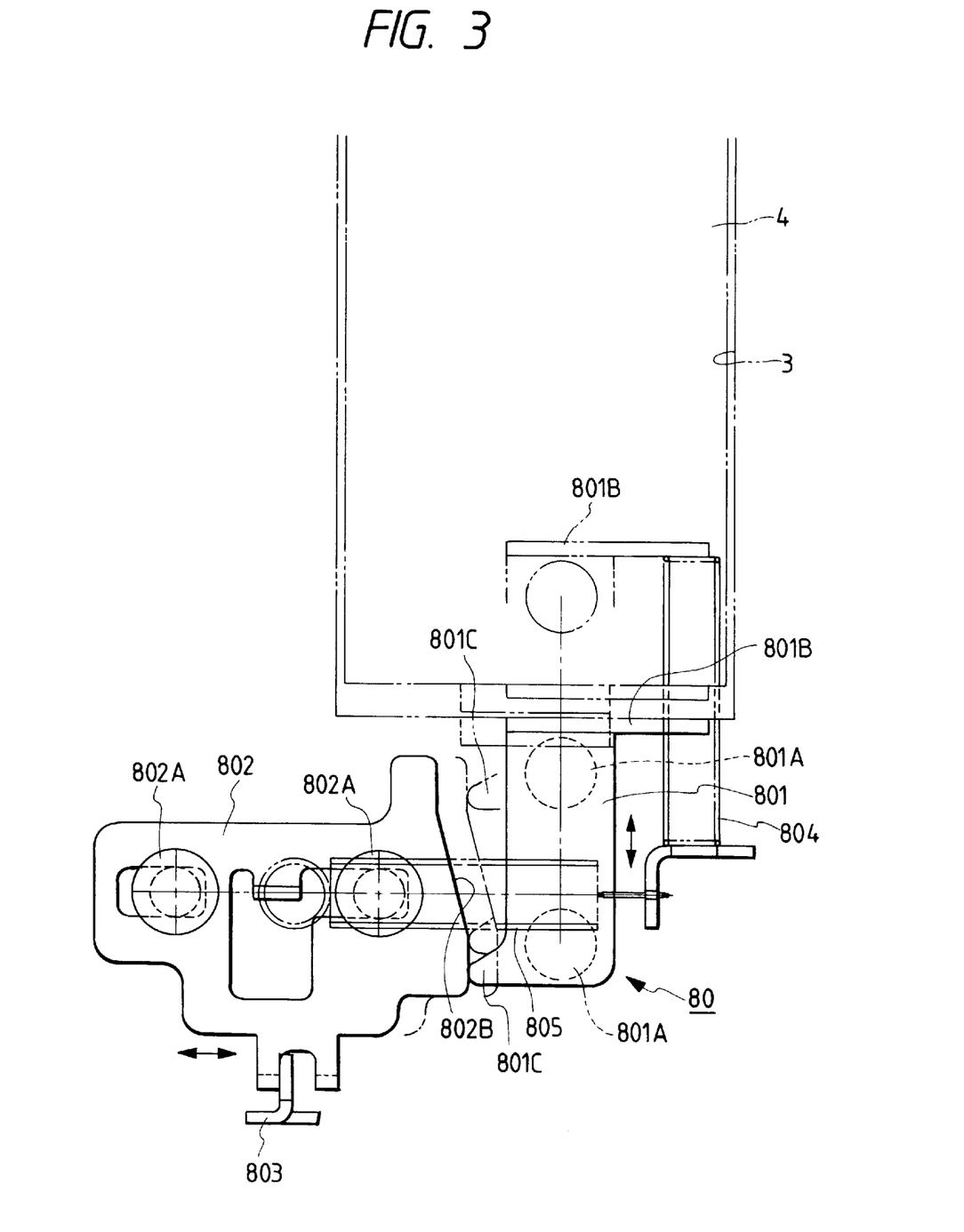
FIG. 3 is an enlarged side view of a battery presence/absence detection mechanism according to the embodiment of the present invention.

In FIGS. 1 through 3, the film advance device of the camera is comprised of a film advance lever 10; a ratchet mechanism 20 for retaining the film advance lever 10 in a current state even if a finger is released from the film advance lever 10 during the course of actuation of the film advance lever 10; a film winding system 30 which operates in conjunction with the actuation of the film advance lever 10; a shutter charge drive system 40, a mirror charge drive system 50, a film advance stop mechanism 60 which inhibits the advancement of film regardless of the actuation of the film advance lever 10 after the film has been advanced to a predetermined extent; a winding prevention mechanism 70 which prevents the advancement of film when a battery is at the end of its use or is removed from the camera; and a battery presence/absence check mechanism 80 which operates according to the presence or absence of the battery in the camera.

The film advance lever 10 is supported by a shaft 101 rotatively provided in a main leaf 1 in such a way as to be able to pivot between a starting point (a lever housing position) and an end point (within an angle of about 180 degrees). The film advance lever 10 is forced so as to automatically return to the starting point by an unillustrated torsion spring or the like.

A ratchet mechanism 20 is comprised of a ratchet wheel 201 coaxially fixed to the shaft 101 of the film advance lever 10, and a ratchet pawl 202 which engages with the ratchet wheel 201.

The extent of rotation of the ratchet wheel 201 is specified by an unillustrated stopper so that it can rotate within an angle of about 180 degrees between the starting point and the end point.

Figure 4A:
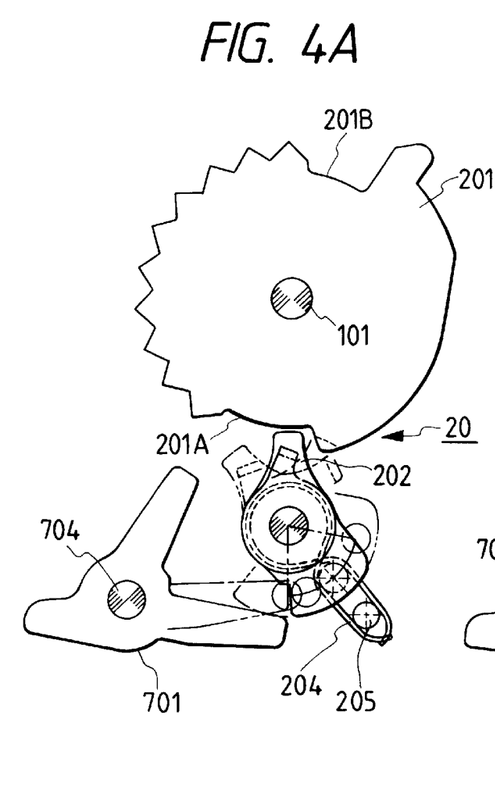
FIGS. 4A through 4C are schematic representations illustrating the operation relationship between a ratchet wheel and a ratchet pawl according to the embodiment of the present invention.
Figure 4B:
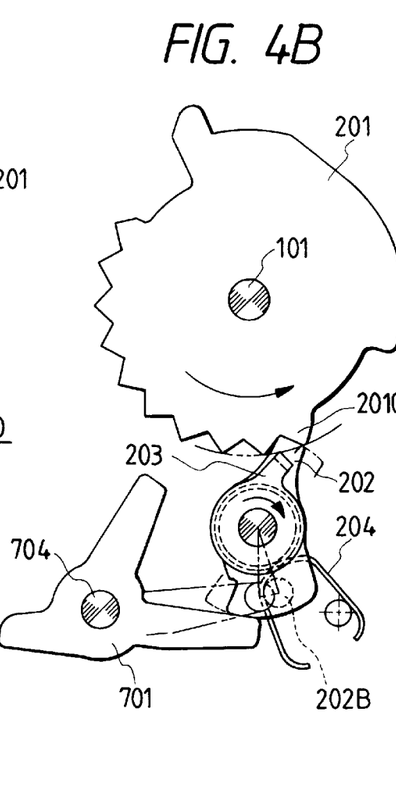
Figure 4C:
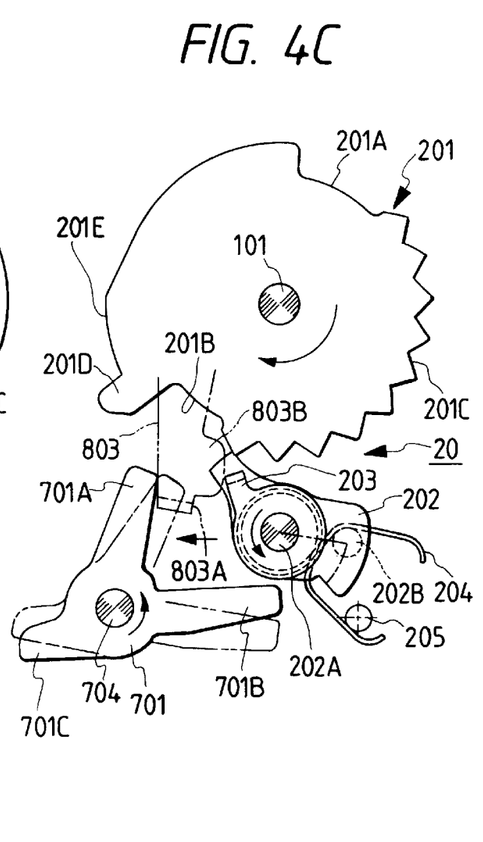

As illustrated in FIGS. 1 and 4, the ratchet wheel 201 has a first notch 201A and a second notch 201B which are spaced apart from each other in the circumferential direction of the ratchet wheel 201 at an angular interval corresponding to the winding-up operation angle of the film advancing lever 20, and which elongate in predetermined angular regions. Triangular rachet teeth 201C are formed along the circumference of the ratchet wheel 201 between the first notch 201A and the second notch 201B for engagement with the rachet pawl 202. A protuberance 201D radially extends from a part of the circumference of the ratchet wheel 201 and is adjoined to the second notch 201B. A cam 201E is formed along a part of the circumference of the ratchet wheel 201 and is adjoined to the protuberance 201D.

When the film advance lever 10 is situated at the starting point, the ratchet pawl 202 is pivotally supported on the main leaf 1 by a shaft 202A so as to confront with the first notch 201A of the ratchet wheel 201. A set lever 203 for placing the double winding prevention mechanism 70 in a reset state is integrally provided on the rachet pawl 202. A shear spring 204 substantially in the form of "Ω" is attached to the ratchet pawl 202 coaxially with respect to the shaft 202A. The spring 204 has end portions which clamp or nip a spring latch protrusion 202B provided upright in one end of the ratchet pawl 202 and a fixed pin 205 provided upright on the main leaf 1 therebetween.

By this arrangement, when the other end of the ratchet pawl 202 confronts with the first notch 201A or the second notch 201B of the ratchet wheel 201, the rachet pawl 202 is retained in a neutral position as illustrated in FIG. 1. Further, the rachet pawl 202 is angular-moved in a first direction as a consequence of the rotation of the ratchet wheel 201 in the direction of film advance at the time of actuation of the film advance lever 10 from the starting point to the end point, and in a second direction opposite to the first direction as a consequence of the return rotation of the ratchet wheel 201 at the time of the return of the film advance lever 10 from the end point to the starting point.

Further, when the film advance lever 10 is actuated in the direction of film advance, the other end of the ratchet pawl 202 engages with the rachet teeth 201C of the ratchet wheel 201 in a clicking manner, permitting the film advance actuation of the film advance lever 10. If a finger is released from the film advance lever 10 during the course of actuation of the film advance lever 10, the other end of the ratchet pawl 202 engages with the rachet tooth 201C of the ratchet wheel 201, thereby locking the return of the film advance lever 10.

The film winding system 30 is comprised of a first gear 301 coaxially fixed to the shaft 101 of the film advance lever 10; a second gear 303 which meshes with the first gear 301 and is fixed to a shaft 302 rotatively supported on the main leaf 1; a third gear 304 attached to the shaft 302 via an unillustrated one-way clutch for connection with the shaft 302 only in the direction of film advance; a fourth gear 306 which meshes with the third gear 304 and is rotatively supported on a spool shaft 305 rotatively supported by the main leaf 1; and a spool ratchet wheel 307 which is fixed to the spool shaft and is coupled to the fourth gear 306 by way of an unillustrated friction clutch. The rotation of the ratchet wheel 307 contributes to the actual winding of the film.

The shutter charge drive system 40 is comprised of a film advance main gear 401 rotatively attached to the shaft 101 of the film advance lever 10; and a charge changeover lever 403 which is rotatively supported at its center by a pin 402 within the plane of the film advance main gear 401 in the vicinity of the outer periphery of the film advance main gear 401. A hook 403A formed at one end of the charge changeover lever 403 is forced (counterclockwise) by an unillustrated spring so as to engage with a charge changeover pin 404 provided upright on the ratchet wheel 201 of the ratchet mechanism 20. The shutter charge drive system 40 further comprises a shutter charge gear 406 which is rotatively supported by a shaft 405 so as to mesh with the film advance main gear 401; a pair of first and subsequent blinds charge gears 407 which are coaxially stacked and provided on the shaft 405 of the shutter charge gear 406; a first blind pinion gear 408 which meshes with the upper gear of the charge gears 407; and a subsequent blind pinion gear 409 which meshes with the lower gear of the charge gears 407. With the pinion gears 408 and 409, a first blind and a subsequent blind in a known focal-plane shutter are charged in conjunction with film advance operation of the film advance lever 10.

The mirror charge system 50 has a mirror charge gear 501 which meshes with the film advance main gear 401. The mirror charge system 50 is arranged such that the known quick-turn mirror mechanism is charged by this mirror charge gear 501.

As illustrated in FIG. 1, the film advance stop mechanism 60 is comprised of a lock lever 602 for stopping the advancement of film the intermediate portion of which is rotatably supported by the shaft 601 provided on the main leaf 1 and which has a hook 602A formed at one end so as to engage with or disengage from the spool ratchet wheel 307; a torsion spring 603 which forces the lock lever 602 clockwise (in the direction in which the hook 602A engages with the ratchet wheel 307); and a lock control means 604 connected to the other end of the lock lever 602.

The lock control means 604 is comprised of a movable element 604A connected to the other end of the lock lever 602, a magnet 604B which, by attracting the movable element 604A, retains the lock lever 602 in a reset state so as not to engage with the ratchet wheel 307; and an electromagnetic coil 604C which is energized to decrease the attracting force of the magnet 604B to thereby release the lock lever 602 from the reset state, when the extent of advancement of film has reached a specified extent.

The timing at which power is applied to the electromagnetic coil 604C of the lock control means 604 is controlled by a signal received from a film advance detection means 100, which will be described later. The lock lever 602 is reset by a subsequent blind travel completion lever (not shown) which is actuated when the subsequent blind of the focal-plane shutter has finished traveling.

The winding prevention mechanism 70 not only prevents the film from being advanced when a battery is at the end of its life or is removed from the camera, but also prevents double advancement of film before the shutter is released. As illustrated in FIGS. 1 and 2, the winding prevention mechanism 70 is comprised of a first winding lock lever 701, a second winding lock lever 702, and a lock control means 703.

The first winding lock lever 701 is Y-shaped in a plane view, which is rotatively supported at its central portion on the camera body (not shown) by a shaft 704 and is forced counterclockwise by a spring 705.

A first engagement section 701A of the Y-shaped first winding lock lever 701 is in contact with one side of a protuberance 803A formed at the other end of a second battery presence/absence transmission lever 803 of the battery presence/absence check mechanism 80, which will be described later, opposite to the other side of the protuberance 803A with which the set lever 203 comes into contact. As a result of pivotal return movement of the film advance lever 10 from the end point to the starting point, the rachet teeth 201C of the ratchet wheel 201 pivots the ratchet pawl 202 in a second direction shown in FIG. 4C, which in turn rotates the second battery presence/absence transmission lever 803 clockwise as well as the first winding lock lever 701 counterclockwise.

When the first winding lock lever 701 rotates counterclockwise, a second engagement section 701B engages with the spring latch protrusion 202B of the ratchet pawl 202. In this state, if the film advance lever 10 is actuated before the shutter is released, the spring latch protrusion 202B of the ratchet pawl 202 engages with the front end of the second engagement section 701B, thereby preventing the clockwise pivotal movement of the ratchet pawl 202. Concurrently, the ratchet wheel 201 is also locked, thereby preventing double advancement of film.

The second winding lock lever 702 is adjacent to the first winding lock lever 701 and is rotatively supported on the camera body (not shown) via a shaft 706. The second winding lock lever 702 is forced counterclockwise by a spring 707. One end of the second winding lock lever 702 engages with a third engagement section 701C of the first winding lock lever 701 via a protrusion 702A. The other end of the second winding lock lever 702 is joined to the lock control means 703.

The lock control means 703 is comprised of a movable element 703A connected to the other end of the second winding lock lever 702; a magnet 703B which retains the first and second winding lock levers 701 and 702 in a double advance prevention position (the reset state indicated by a phantom line in FIG. 1) by attracting the movable element 703A; and an electromagnetic coil 703C. According to a signal produced when a charge-of-status checking means 90 has determined that the capacitance of the battery is larger than a specified value and a signal produced when the shutter is released, power is applied to the electromagnetic coil 703C, so that the attracting force of the magnet 703B is decreased so as to release the first and second winding lock levers 701 and 702.

As illustrated in FIGS. 1 and 3, the battery presence/absence check mechanism 80 is comprised of a battery presence/absence detection lever 801 which advances or recedes in conjunction with the insertion or removal of a battery 4 into or from a battery housing 3 formed in the grip section of the camera body 2 (not shown); a first battery presence/absence transmission lever 802 which moves in the direction orthogonal to the direction in which the battery presence/absence detection lever 801 advances or recedes, in conjunction with the movement of the battery presence/absence detection lever 801; and a second battery presence/absence transmission lever 803 which moves in conjunction with the first battery presence/absence transmission lever 802.

The battery presence/absence detection lever 801 is supported on the camera body 2 by a pin 801A so as to be movable in the longitudinal direction of the battery housing 3. Further, the battery presence/absence detection lever 801 is forced by a spring 804 so as to project to the inside of the battery housing 3. An engagement section 801B which engages with the end of the battery 4 is formed at the end of the battery presence/absence detection lever 801 which projects into the battery housing 3. A protuberance 801C which comes into contact with the first battery presence/absence transmission lever 802 is formed on the other end of the battery presence/absence detection lever 801.

The first battery presence/absence transmission lever 802 is supported on the camera body 2 by a pin 802A so as to be movable in the direction orthogonal to the direction in which the battery presence/absence detection lever 801 advances or recedes. The end of the first battery presence/absence transmission lever 802 with which the protuberance 801C of the battery presence/absence detection lever 801 comes into contact, is formed into a cam 802B. The first battery presence/absence transmission lever 802 is forced by a spring 805 so that the cam 802B is constantly pressed into contact with the protuberance 801C.

The second battery presence/absence transmission lever 803 transmits information regarding the presence/absence of the battery to the double winding prevention mechanism 70. The midpoint portion of the second battery presence/absence transmission lever 803 is rotatively attached to the shaft 601 of the lock lever 602. Further, the battery presence/absence transmission lever 803 is connected at one end to the first battery presence/absence transmission lever 802 and is connected at the other end to the first engagement section 701A of the first winding lock lever 701 of the double winding prevention mechanism 70.

In FIG. 1, reference numeral 110 designates a first angular backup switch which is turned on when the film advance lever 10 is actuated through a predetermined angle from the starting point. This first angular backup switch 110 and a second angular backup switch 120 are arranged side by side in the circumferential direction of the ratchet wheel 201 while they are electrically insulated from the main leaf 1. By actuation of the film advance lever 10 from the starting point, the protuberance 201D of the ratchet wheel 201 comes into contact with the angular backup switches 110 and 120 in order, thereby grounding the ratchet wheel 201. As a result, an ON signal is output.

The first angular back up switch 110 is made from an elastic contact piece, which has a clicking section 110A at its tip end. This clicking section 110 engages with the protuberance 201D of the ratchet wheel 201. By actuation of the film advance lever 10 through a predetermined angle (a backup angle) from the starting point, the protuberance 201D goes over clicking section 110A, thus retaining the film advance lever 10 in its current pivotal position even if a finger is released from the film advance lever 10.

Figure 5:
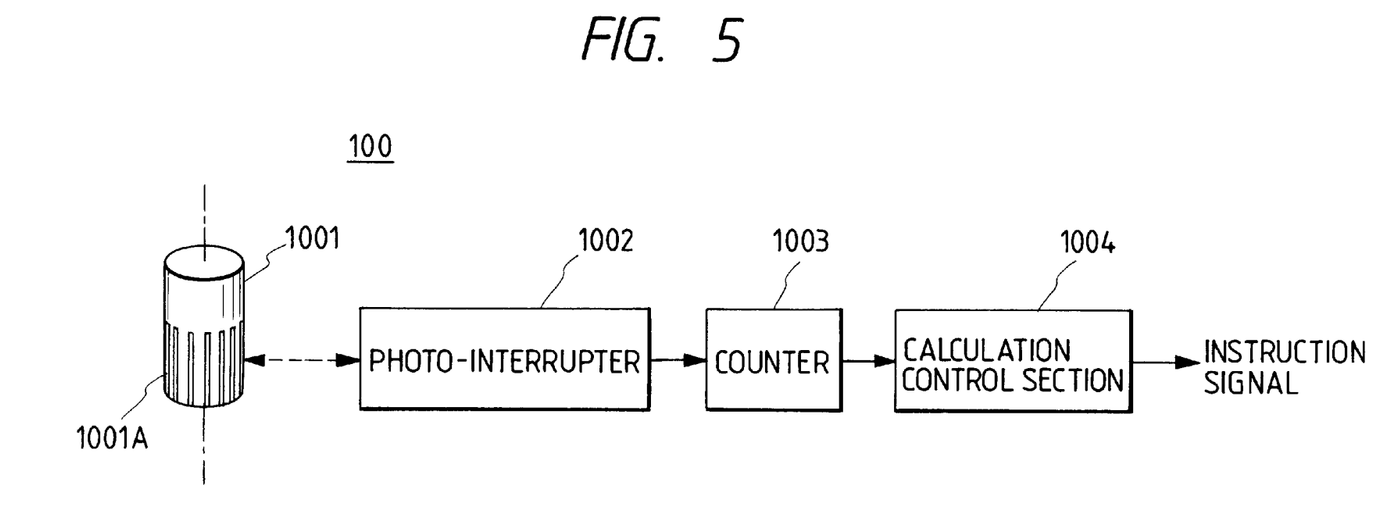
FIG. 5 is a block diagram illustrating the configuration of a film advance detection means according to the embodiment of the present invention.

As shown in FIG. 5, the film advance detection means 100 is comprised of a roller 1001 which rotates according to the extent of advance of a Blowny film and has a series of light and dark patterns 1001A formed at given pitches along the outer peripheral surface of the roller 1001; a photo-interrupter 1002 which optically detects the variations in the light and dark patterns 1001A resulting from the rotation of the roller 1001 and generates pulses in accordance with the rotation angle; a counter 1003 which counts the pulses from the photo-interrupter 1002; and a calculation control section 1004 which calculates, on the basis of the count value of the counter 1003, the extent of advancement of film by one frame and the extent required to advance the film from the start mark of the Blowny film until the first frame of the film arrives at the aperture of the camera body and outputs respective signals.

The operation of the camera according to the present embodiment having the foregoing structure will be described.

First, a Blowny film (not shown) is loaded into a Blowny film camera (not shown), and a start mark printed on the reverse side of the film is brought into alignment with an index marked on the body of the camera. Then, the back cover (not shown) of the camera body is closed. The following explanation is given of a case where the film is fed until the first frame of the film comes to the aperture of the camera body while the camera is in the foregoing state.

In FIG. 1, the film advance lever 10 is actuated counterclockwise from the starting point. In conjunction with the actuation of the film advance lever, the protuberance 201D of the ratchet wheel 201 which rotates integrally together with the film advance lever 10 comes into contact with the first angular backup switch 110, thereby turning on the first angular backup switch 110. The protuberance 201D goes over the first angular backup switch 110, thereby coming into contact with the second angular backup switch 120, turning off the first angular backup switch 120 and turning on the second angular backup switch 120. In response to a signal regarding the turning on of the first angular backup switch 110, the photo-interrupter 1002 and the counter 1003 become operative.

At this time, the battery 4 having sufficient capacitance is housed in the battery housing 3. Accordingly, the battery presence/absence detection lever 801 advances as indicated by a solid line in FIG. 3. Then, the first battery presence/absence transmission lever 802 is moved to the position indicated by a solid line in FIG. 3 by means of the protuberance 801C and the cam 802B. Therefore, the second battery presence/absence transmission lever 803 pivots to and is retained in the position indicated by the solid line in FIG. 1.

Further, the charge-of-status checking means 90 performs a check of the charge status of the battery 4 using a terminal voltage. If the battery 4 has a charge status equal to or greater than a preset value, the charge-of-status checking means 90 outputs a high-level signal.

If the film advance actuation lever 10 is further actuated toward the film actuation end point in this state, the rotation of the gear 301 which rotates integrally together with the film advance actuation lever 10 is transmitted to the spool shaft 305 via the gears 303 and 304, the friction clutch (not shown), and the ratchet wheel 307, thereby winding the film. If the roller 1001 rotates in accordance with the advancement of film, the photo-interrupter 1002 optically detects variations in the light and dark patterns 1001A and counts the pulses generated according to a rotational angle of the roller 1001 through use of the counter 1003. The value thus counted by the counter 1003 is delivered to the calculation control section 1004. Then, it is decided whether or not the film has been fed from its start mark to a position about one frame before where the first frame would be positioned at the aperture of the camera body.

In contrast, if the film advance lever 10 reversely pivots through an angle corresponding to the circumferential length of the second notch 201B after the second notch 201B has been placed opposite to the ratchet pawl 202; namely, the film advance lever 10 has been fully pivoted to the end point, the ratchet pawl 202 is pivoted counterclockwise (in a second direction) by the crests of rachet teeth 201C against the force of the spring 204 as illustrated in FIG. 4C. As a result, the set lever 203 integrally formed with the ratchet pawl 202 presses the second battery presence/absence transmission lever 803 in the direction designated by the arrow in FIG. 4C, so that the set lever 203 pivots clockwise. Further, the first winding lock lever 701 of the double winding prevention mechanism 70 is pivoted counterclockwise, and the second winding lock lever 702 is pivoted clockwise. As a result, the other end of the second winding lock lever 702 is attracted by the magnet 703B of the lock control means 703 via the movable element 703A. Then, the double winding prevention mechanism 70 is retained in the reset state in which it prevents the film from being advanced double.

In conjunction with the pivotal movement of the film advance lever 10 to its original position, the ratchet wheel 201 integrally rotates together with the film advance lever 10 while engaging with the ratchet pawl 202 in a clicking way, resulting in the state shown in FIG. 4A.

The counter 1003 has not reached the count which causes advancement of film from the start mark to a position one frame before where the first frame of the film would be placed at the aperture of the camera body. Consequently, the film advance lever 10 returns to its original start point and is actuated again so as to advance the film to a position one frame before where the first frame of the film would be placed at the aperture of the camera body.

As a result of re-actuation of the film advance lever 10 from the starting point, the protuberance 201D of the ratchet wheel 201 brings the first angular backup switch 110 into an off state from an on state, and the second angular backup switch 120 is turned on. By means of an issued ON-signal, power is instantly applied to the electromagnetic coil 703C of the lock control means 703 in the double winding prevention mechanism 70. When the electromagnetic coil 703C is energized, the attracting force of the magnet 703B instantly decreases. Then, the second winding lock lever 702 attracted to and held in the reset position by the magnet 703B is pivoted to the position indicated by a solid line in FIG. 1 by the spring 707, and the first winding lock lever 701 is pivoted to the position indicated by a solid line in FIG. 1. The second engagement section 701B recedes from the position where it engages with the spring latch protrusion 202B of the ratchet pawl 202. As a result, the film advance lever 10 becomes operative.

In this state, when the film advance lever 10 is actuated in the film advance direction, the film is advanced by actuating the film advance lever 10 further toward the end point. When the counter 1003 has counted up to a value corresponding to the extent of advancement of film to a position one frame before where the first frame of the film would be placed at the aperture of the camera body, the calculation control section 1004 outputs a reset release instruction signal to the lock control means 604 of the film advance stop mechanism 60. As a result, power is instantly applied to the electromagnetic coil 604C, energizing the electromagnetic coil 604C. Then, the attracting force of the magnet 604B instantly decreases. The lock lever 602 attracted to and retained in the reset position by the magnet 604B is pivoted clockwise in FIG. 1 by means of the torsion spring 603, so that the lock lever 602 is caught by the ratchet wheel 307. Therefore, even if the film advance lever 10 is in the course of its actuation, the film is prevented from being advanced by the actuation of the film advance lever 10.

Subsequently, if the finger is released from the film advance lever 10 the instant when the film advance lever 10 has arrived at the end point, the film advance lever 10 automatically returns to its original starting point by means of a return spring (not shown).

If the finger is released from the film advance lever 10 during the course of its actuation, the front end of the ratchet pawl 202 engages with a recessed portion of the rachet teeth 201C of the ratchet wheel 201. Therefore, the ratchet wheel 201 is locked and is prevented from rotating in the reverse direction, thereby preventing the film advance lever 10 from returning during the course of its actuation.

Next, an explanation is given of the advancement of film at the time of a practical photographing operation after the film has been fed.

When the film advance lever 10 is actuated, the protuberance 201D of the ratchet wheel 201 that rotates integrally together with the film advance lever 10 comes into contact with and turns on the angular backup switch 110. A resultantly-issued ON-signal is used as an enable signal for permitting the releasing of the shutter. Then, when the first angular backup switch 110 is turned off associated with the actuation of the film advance lever 10, a resultantly-issued OFF-signal turns on a control means (not shown), so that the charge changeover switch 403 is pivoted counterclockwise. The hook 403A of the charge changeover switch 403 engages with the charge changeover pin 404 of the ratchet wheel 201 that rotates integrally together with the film advance lever 10. The second angular backup switch 120 is then turned on, and power is applied to the photo-interrupter 1002, the counter 1003 and the calculation control section 1004 of the film advance detection means 100 according to a resultantly-issued ON-signal. As a result, the film advance detection means 100 is brought into an operative condition.

When the film advance lever 10 is actuated further toward the end point, the film advance main gear 401 rotates together with the ratchet wheel 201 in the same direction after the charge changeover pin 404 has engaged with the actuation changeover lever 403. By transmission of the rotation of the film advance main gear 401 to the train of charge gears of the shutter charge drive system 40, the first and subsequent blinds of the known focal-plane shutter are charged. At the same time, the rotation of the film advance main gear 401 is transmitted to the mirror charge drive system 50, as well. In this way, the known quick-return mirror mechanism is charged.

In contrast, as a result of the operation of the film winding system 30 associated with the actuation of the film advance lever 10, the film is taken up by a spool which rotates integrally together with the ratchet wheel 307.

The photo-interrupter 1002 optically detects variations in the light and dark patterns 1001A of the roller 1001 that rotates according to the extent of advancement of film. The counter 1003 counts the number of pulse signals output from the photo-interrupter 1002. When the count of the counter 1003 has counted a value corresponding to the extent of advancement of film by one frame, the calculation control section 1004 outputs the reset release instruction signal to the lock control means 604 of the film advance stop mechanism 60. As a result, power is instantly applied to the electromagnetic coil 604C, thereby energizing it. The attracting force of the magnet 604B instantly decreases, so that the lock lever 602 attracted to and retained in the reset position by the magnet 604B is released.

Associated with the releasing of the lock lever 602, it is pivoted clockwise in FIG. 1 by means of the torsion spring 603. Then, the lock lever 602 is caught by the ratchet wheel 307, thereby locking the ratchet wheel 307 and preventing the advancement of film.

Even if the film advance lever 10 is in the course of its actuation, there is slippage of the friction clutch (not shown) which connects the ratchet wheel 307 and the gear 306, and therefore the film is prevented from being advanced by the actuation of the film advance lever 10.

If the film advance lever 10 pivots to the starting point through an angle corresponding to the circumferential length of the second notch 201B after having been actuated to the end point, the ratchet pawl 202 is pivoted counterclockwise or in the second direction by means of the crests of the rachet teeth 201C against the force of the spring 204 as shown in FIG. 4C. The set lever 203 integrally formed with the ratchet pawl 202 presses the second battery presence/absence transmission lever 803 in the direction designated by the arrow in FIG. 4C. The second battery presence/absence transmission lever 803 then pivots clockwise, whereas the first winding lock lever 701 of the double winding prevention mechanism 70 pivots counterclockwise. At the same time, the second winding lock lever 702 pivots clockwise. As a result, the other end of the second winding lock lever 702 is attracted by the magnet 703B of the lock control means 703 via the movable element 703A. The double winding prevention mechanism 70 is held in the reset state where it prevents the film from being advanced double.

Accordingly, if the film advance lever 10 is actuated again without releasing the shutter, the spring latch protrusion 202B of the ratchet pawl 202 comes into contact with the second engagement section 701B of the first lock lever 701 retained in the locked position. As a result, the clockwise pivotal movement of the ratchet pawl 202 is limited, thereby locking the counterclockwise rotation of the ratchet wheel 201. Concurrently, it becomes impossible for the film advance lever 10 to pivot toward the end point, enabling prevention of double advancement of film.

In contrast, when the unillustrated shutter release button is pressed to release the shutter, the first blind of the focal-plane shutter travels. A subsequent blind travel completion lever (not shown) which operates after the subsequent blind has finished traveling pivots the lock lever 602 counterclockwise in FIG. 1. The magnet 604B of the film advance stop mechanism 60 attracts and retains the lock lever 602 in that state, bringing the film advance stop mechanism 60 in the reset state.

As a result, it becomes possible to advance the film next time.

Next, an explanation will be given of the operation of the film advance device when the battery 4 is not housed in the battery housing 3.

In this case, the battery presence/absence detection lever 801 is held in a receded position indicated by a two dot chain line in FIG. 3. Therefore, the first battery presence/absence transmission lever 802 forced by the spring 805 has moved to the position indicated by a two dot chain line in FIG. 3. As a result, the second battery presence/absence transmission lever 803 is pivoted to the position indicated by a two dot chain line from the position indicated by a solid line in FIG. 1. At the same time, the first winding lock lever 701 of the double winding prevention mechanism 70 is pivoted counterclockwise. In conjunction with this pivotal movement, the second winding lock lever 702 pivots clockwise, so that the magnet 703B of the lock control means 703 attracts the other end of the second winding lock lever 702 via the movable element 703A. The double winding prevention mechanism 70 is held in the reset state in which it prevents the film from being advanced.

Accordingly, if the film advance lever 10 is actuated while the battery 4 is not housed in the battery housing 3, the spring latch protrusion 202B of the ratchet pawl 202 comes into contact with the second engagement section 701B of the first lock lever 701 held in the locked position, thereby limiting the clockwise rotation of the ratchet pawl 202. Consequently, the counterclockwise rotation of the ratchet wheel 201 is locked, concurrently rendering it impossible for the film advance lever 10 to be actuated to the end point. In this way, the wasteful advancement of film is prevented if there is no battery.

If the user finds that the battery is not housed in the camera as a result of incapability of actuation of the film advance lever 10, the battery 4 is housed in the battery housing 3. Upon insertion of the battery 4 into the battery housing 3, the battery presence/absence detection lever 801 advances to the position indicated by the solid line in FIG. 3. In conjunction with this movement, the protuberance 801C advances while remaining in pressed contact with the cam 802B, thereby moving the first battery presence/absence transmission lever 802 to the position indicated by a solid line in FIG. 3. As a result, the second battery presence/absence transmission lever 803 is pivoted to the position indicated by the solid line in FIG. 1, thereby releasing the first lock lever 701 from a limited state and permitting its clockwise rotation.

If the inserted battery 4 has a sufficient charge status, a high-level signal is output from the charge-of-status checking means 90. According to this high-level signal and the signal output associated with the releasing of the shutter, power is instantly applied to the electromagnetic coil 703C of the lock control means 703 of the double winding prevention mechanism 70. As a result, if the electromagnetic coil 703C is energized, the attracting force of the magnet 703B instantly decreases. The second winding lock lever 702 attracted to and held in the reset position by the magnet 703B is pivoted to the position indicated by the solid line in FIG. 1 by the spring 707. The first winding lock lever 701 is also pivoted to the position indicated by the solid line in FIG. 1, thereby causing the second engagement 701B to recede from the position where it engages with the spring latch protrusion 202B of the ratchet pawl 202. As a result, the actuation of the film advance lever 10 becomes feasible.

If the charge status of the battery 4 is smaller than or equal to the preset value, the charge-of-status checking means 90 that checks the charge status of the battery 4 outputs a low-level signal. Accordingly, the lock control means 703 of the double winding prevention mechanism 70 is not released from the reset state, preventing the actuation of the film advance lever 10. Resultantly, the wasteful advancement of film is prevented.

If the battery 4 is removed from the battery housing 3 during the course of actuation of the film advance lever 10, the battery presence/absence detection lever 801 recedes to the position indicated by a two dot chain line in FIG. 3. Then, the first battery presence/absence transmission lever 802 moves to the position indicated by a two dot chain line in FIG. 3, so that the second battery presence/absence transmission lever 803 is pivoted to the position indicated by a two dot chain line from the position indicated by a solid line in FIG. 1. As a result, the first winding lock lever 701 of the double winding prevention mechanism 70 is pivoted counterclockwise, which in turn pivots the second winding lock lever 702 clockwise. The other end of the second winding lock lever 702 is attracted by the magnet 703B of the lock control means 703 via the movable element 703A, thereby bringing the double winding prevention mechanism 70 in the reset state in which it prevents the film from being advanced. Resultantly, the wasteful advancement of film can be prevented.

The film advance device, according to the previous embodiment, is provided with the battery presence/absence detection mechanism 80 which operates according to the presence/absence of the battery 4 in the battery housing 3. When the battery 4 is not housed in the battery housing 3 or when it is removed from the same during the course of actuation of the film advance lever 10, the battery presence/absence detection lever 801 and the first and second battery presence/absence transmission levers 802 and 803 operate, thereby pivoting the first winding lock lever 701 of the double winding prevention mechanism 70 to the position where it limits the pivotal movement of the ratchet pawl 202 in the first direction. The second lock lever 702 is attracted to and held in the reset state by the magnet 703B of the lock control means 703 so as to prevent the actuation of the film advance lever 10. As a result, when there is no battery; namely, when the battery is not housed in the camera, the film can be prevented from being advanced, resulting in prevention of wasteful advancement of film.

Further, in the present embodiment, the double winding prevention mechanism 70, which operates via the ratchet mechanism 20 moved in conjunction with the actuation of the film advance lever 10 from the starting point to the end point, is comprised of the first winding lock lever 701, the second winding lock lever 702, and the lock control means 703. The lock control means 703 is further comprised of the magnet 703B and the electromagnet coil 703 for reducing the attracting force of the magnet 703B. When the film advance lever 10 returns to the starting point from the end point, the first winding lock lever 701 is pivoted to the position where it limits the pivotal movement of the ratchet pawl 202 in the first direction, in conjunction with the pivotal movement of the ratchet pawl 202 in the second direction resulting from the rotation of the ratchet wheel 201. The second lock lever 702 is attracted to and held in the reset state by the magnet 703B of the lock control means 703 so as to prevent the actuation of the film advance lever 10. According to the signal produced when the shutter is released, power is instantly applied to the electromagnetic coil 703C, thereby reducing the attracting force of the magnet 703B. Then, the second lock lever 702 is released from the reset state. As described above, the mechanical structure of the double winding prevention mechanism 70 is simplified, enabling easy achievement of cost reduction. Further, stable prevention of advancement of film without being affected by the accuracy of components, such as a lock lever, becomes feasible.

Further, in the present embodiment, when the extent to which the film is advanced by the film advance drive system 30 which operates together with the film advance lever 10 has reached a predetermined extent, the film advance stop mechanism 60 locks the rotation of the spool of the film advance drive system 30. The film advance stop mechanism 60 is released from a take-up enable condition by the lock control means 604 according to the signal issued when the film advance detection means 100 detects that the film has been advanced to a specified extent. Therefore, the mechanical structure of the film advance stop mechanism 60 is simplified, thereby enabling cost reduction. The stable advancement of film without being affected by the accuracy of components becomes feasible.

As is evident from the above descriptions, there is provided a battery presence/absence detection mechanism which operates according to the presence/absence of a battery in a camera. When the battery is not present in the camera or is removed from the camera during the course of advancement of film, the battery presence/absence detection mechanism operates so as to cause a double winding prevention mechanism to prevent the pivotal movement of a ratchet pawl in a first direction. The double winding prevention mechanism is held in a reset state in which a film advance lever cannot be actuated. Consequently, when there is no battery; namely, when the battery is not housed in the camera, the film can be prevented from being advanced, enabling prevention of wasteful advancement of film.

Further, for the case where the battery is housed in the camera, if charge-of-status check means detects that the charge status of the battery is smaller than or equal to a preset value, the double winding prevention mechanism is not released from the reset state. Therefore, the wasteful advancement of film can be similarly prevented.

The double winding prevention mechanism operates via a ratchet mechanism which operates in conjunction with the pivotal actuation of the film advance lever from a starting point to an end point. When the film advance lever returns to the starting point from the end point, the rotation of the ratchet wheel is locked in conjunction with the pivotal movement of the ratchet pawl in the second direction by limiting the pivotal movement of the same in the first direction, preventing the advancement of film. The winding mechanism is held in the reset state in which the film advance lever cannot be actuated, by the control means. According to a signal produced when a shutter is released, the control means is actuated so as to release the double winding prevention mechanism from the reset state. As a result, the mechanical structure of the double winding prevention mechanism is simplified, enabling easy accomplishment of cost reduction. Further, stable advancement of film without being affected by the accuracy of components can be prevented.

What is claimed is:

1. A manual film advance device for use with a camera, which actuates a film advance drive system in conjunction with actuation of a film advance lever from a starting point to an end point, said manual film advance device comprising:

a ratchet mechanism having a ratchet wheel which rotates together with the film advance lever and a ratchet pawl which engages with the ratchet wheel, wherein the ratchet pawl is arranged so as to pivot in a first direction by rotation of the ratchet wheel at the time of actuation of the film advance lever, and to pivot in a second direction opposite to the first direction by rotation of the ratchet wheel when the film advance lever returns to the starting point from the end point;

a battery presence/absence detection mechanism which operates according to presence/absence of a camera battery;

a winding prevention mechanism which locks rotation of the ratchet wheel so as to prevent advancement of film by limiting the pivotal movement of the ratchet pawl in the first direction in conjunction with action of the battery presence/absence detection mechanism when the battery presence/absence detection mechanism detects the absence of the battery; and a controller which retains the winding prevention mechanism in a reset state wherein the film cannot be advanced when the pivotal movement of the ratchet pawl in the first direction is limited.

2. The manual film advance device as defined in claim 1, further comprising battery capacitance checking system which checks capacitance of the battery, wherein the winding prevention mechanism is released from the reset state by controlling the controller according to a signal produced when the battery capacitance checking system decides the capacitance of the battery to be equal to or greater than a predetermined value and to a signal produced when a shutter is released.

3. The manual film advance device as defined in claim 1 or 2, wherein the battery presence/absence detection mechanism includes a battery presence/absence detection lever which advances or recedes in conjunction with removal or insertion of the battery from or into the camera, a first battery presence/absence transmission lever which moves in conjunction with the advance or receding of the battery presence/absence detection lever, and a second battery presence/absence transmission lever which operates in conjunction with the first battery presence/absence transmission lever and brings the winding prevention mechanism into the reset state upon detection of the absence of the battery.

4. The manual film advance device as defined in claims 1 or 2, wherein the ratchet mechanism is arranged so that the ratchet pawl engages with the ratchet wheel thereby to lock the return of the film advance lever when the film advance lever is stopped during the actuation thereof.

5. The manual film advance device as defined in claims 1 or 2, wherein the winding prevention mechanism locks rotation of the rachet wheel and prevents double advancement of film by limiting the pivotal movement of the ratchet pawl in the first direction in conjunction with the pivotal movement of the ratchet pawl in the second direction caused when the film advance lever returns to the starting point from the end point.

6. The manual film advance device as defined in claim 5, wherein the winding prevention mechanism has a first winding lock lever, and the first winding lock lever is arranged to pivot to a position where the first winding lock lever limits the pivotal movement of the ratchet pawl in the first direction in conjunction with the pivotal movement of the ratchet pawl in the second direction, as well as to lock rotation of the ratchet wheel by engaging with the ratchet pawl when the film advance lever is actuated.

7. The manual film advance device as defined in claim 6, wherein the winding prevention mechanism is provided with a second winding lock lever connected at one end to the first winding lock lever and at the other end to the controller, and the second winding lock lever brings the film advance lever in the reset state by transmitting to the controller the action of the first winding lock lever performed when pivoted to limit the pivotal movement of the ratchet pawl in the first direction,. and pivots the first winding lock lever to a position where it does not limit the pivotal movement of the ratchet pawl in the first direction according to the release of the winding prevention mechanism from the reset state performed by the controller.

8. The manual film advance device as defined in claim 7, wherein the controller includes a movable element connected to the second winding lock lever of the winding prevention mechanism, a magnet which retains the winding prevention mechanism in the reset state by attracting the movable element, and an electromagnet coil which releases the winding prevention mechanism from the reset state by decreasing attracting force of the magnet upon being energized according to a signal produced when the shutter is released.

9. The manual film advance device as defined in claim 1 or 2, further comprising at least one of a shutter charge drive system and a mirror charge drive system which operate in conjunction with the pivotal actuation of the film advance lever from the starting point to the end point.

10. The manual film advance device as defined in claim 1 or 2, further comprising;
   a film advance stop mechanism which locks rotation of a spool of the film advance drive system when the extent to which the film is advanced by the film advance drive system in conjunction with the film advance lever has reached a specified extent;
   film advance detection mechanism which detects the extent to which the film is advanced by the film advance drive system; and
   a second controller which retains the film advance stop mechanism in a take-up enable state wherein the film can be taken up by the spool, and releases the film advance stop mechanism from the take-up enable state in response to a signal produced when the film advance detection mechanism detects that the extent of advancement of film has reached the specified extent.

11. A manual film advance device for use with a camera in which a film advance lever pivots between a starting point and an end point, and a film advance drive system, a shutter charge drive system, and a mirror charge drive system are activated in conjunction with pivot motion of the film advance lever from the starting point to the end point, said manual film advance device comprising:
   a winding prevention mechanism which prevents the advancement of film by holding the film advance lever in a lock state unless a shutter is released after the shutter charge drive system and the mirror charge drive system are charged in conjunction with the pivotal motion of the film advance lever from the starting point to the end point;
   a battery presence/absence detection mechanism which operates according to the presence/absence of a camera battery;
   battery capacitance checking mechanism which checks capacitance of the battery; and
   a controller which retains the winding prevention mechanism in a reset state wherein the film cannot be advanced if the battery presence/absence detection mechanism operates according to the absence of the battery, and which releases the winding prevention mechanism from the reset state according to a signal produced when the battery capacitance checking system detects that the capacitance of the battery is equal to or greater than a preset value and to a signal produced when the shutter is released.

12. A film advance device for use with a camera for winding-up a film onto a spool by a film advance lever movable between a film winding-up starting point and a film winding-up end point, said film advance device comprising:
   a rachet wheel rotatable in conjunction with movement of the film advance lever;
   a rachet pawl engageable with the rachet wheel and movable between first and second positions wherein the rachet pawl in said first position permits rotation of the rachet wheel in a first direction and the rachet pawl in said second position permits rotation of the rachet wheel in a second direction opposite to the first direction;
   a battery presence/absence transmission lever movable by insertion of a battery into a battery housing of the camera; and
   a first winding lock lever movable between third and fourth positions and associated with the battery presence/absence transmission lever, wherein the first winding lock lever in the third position permits movement of the rachet pawl toward the first position and the first winding lever in the fourth position prohibits movement of the rachet pawl toward the first position.

13. The manual film advance device as defined in claim 12, further comprising:
   a spring biasing the first winding lock lever toward the fourth position.

14. The manual film advance device as defined in claim 12 or 13, further comprising:
   a second winding lock lever associated with the first winding lock lever; and
   a magnet attracting the second winding lock lever and retaining, through the second winding lock lever, the first winding lock lever in the fourth position.

15. The manual film advance device as defined in claim 14, further comprising:
   an electromagnetic coil energized by the battery having a predetermined capacitance, wherein the electromagnetic coil energized by the battery moves the first winding lock lever toward the third position through the second winding lock lever against attraction force of the magnet and biasing force of the spring.

* * * * *